(12) United States Patent
Starnberger (10) Patent No.: US 7,362,798 B1
(45) Date of Patent: Apr. 22, 2008

(54) METHOD FOR TRANSMITTING DATA TO BE TRANSMITTED USING A SUBSCRIBER MODEM

(75) Inventor: Klaus Starnberger, Villach (AT)

(73) Assignee: Infineon Technologies AG, Munich (DE)

( * ) Notice: Subject to any disclaimer, the term of this patent is extended or adjusted under 35 U.S.C. 154(b) by 605 days.

(21) Appl. No.: 10/148,751

(22) PCT Filed: Nov. 23, 2000

(86) PCT No.: PCT/EP00/11682

§ 371 (c)(1),
(2), (4) Date: Sep. 23, 2002

(87) PCT Pub. No.: WO01/41388

PCT Pub. Date: Jun. 7, 2001

(30) Foreign Application Priority Data

Aug. 7, 2000 (DE) .................. 100 38 375

(51) Int. Cl.
*H04B 1/38* (2006.01)

(52) U.S. Cl. ............ 375/222; 375/130; 375/148; 375/219; 379/90.01

(58) Field of Classification Search ........... 375/130, 375/222, 148, 219; 379/90.01
See application file for complete search history.

(56) References Cited

U.S. PATENT DOCUMENTS 6,021,158 A * 2/2000 Schurr et al. ............... 375/211
6,205,220 B1 * 3/2001 Jacobsen et al. ............ 379/417
6,335,922 B1 * 1/2002 Tiedemann et al. ......... 370/335
6,650,697 B1 * 11/2003 Tate et al. ................... 375/222
2004/0081233 A1 * 4/2004 Bremer et al. .............. 375/222

FOREIGN PATENT DOCUMENTS

| DE | 10038375 A1 | 2/2000 |
|---|---|---|
| EP | 0987852 A2 | 7/1999 |
| GB | 2300546 A | 1/1996 |
| WO | WO9859426 | 12/1998 |
| WO | WO9933215 | 7/1999 |
| WO | WO0031890 | 6/2000 |

* cited by examiner

*Primary Examiner*—Mohammed Ghayour
*Assistant Examiner*—Leila Malek
(74) *Attorney, Agent, or Firm*—Maginot, Moore & Beck (57) ABSTRACT

A method transmits data to be transmitted using a subscriber modem of a subscriber access network with adjusted transmission power. The method includes selecting at least one transmission frequency band and subdividing the selected transmission frequency band into several sub-frequency bands. The method also includes determining the maximum transmission power corresponding to each sub-frequency band and transmitting data, using an adjusted transmission power, to a switching modem in the subscriber access network via a corresponding subscriber line. In single-carrier operating mode, the data is transmitted in all sub-frequency bands using a specific, uniform transmission power of the maximum transmission powers that have been determined. In multiple-carrier operating mode, the data is transmitted in the sub-frequency bands using the respective maximum transmission power which has been determined.

16 Claims, 5 Drawing Sheets

METHOD FOR TRANSMITTING DATA TO BE TRANSMITTED USING A SUBSCRIBER MODEM

This application claims the benefit of U.S. Provisional Patent Application No. 60/168,570, filed Dec. 2, 1999, and further claims the benefit of German Patent Application No. 100 38 375, filed Aug. 7, 2000.

FIELD OF THE INVENTION

The invention relates to a method for transmitting transmit data using a subscriber modem of a subscriber access network with adapted transmit power.

BACKGROUND

Subscriber modems are used for transmitting data between a subscriber terminal which can be connected to the subscriber modem, and a switching office. For this purpose, the subscriber modem is connected via a subscriber line to an associated switch modem within the switching office. The various switch modems within the switching office are connected to a switching device, particularly to a multiplexer circuit, in order to switch the various subscriber lines through to a broadband data transmission line. Between the subscriber modem and the associated switch modem, the data are transmitted bidirectionally via various transmission frequency bands. In this arrangement, the data from the subscriber modem to the associated switch modem are transmitted via a first transmission frequency band and the data from the switch modem to the associated subscriber modem are transmitted via a second transmission frequency band. The subscriber modem and the switch modem are so-called FDD (Frequency Division Duplex) modems. The modems are for use in public and private networks.

On the subscriber lines, the data are transmitted by means of different line coding methods. In these methods, a distinction is made between so-called multi carrier methods and single-carrier methods. In the single-carrier methods, a carrier signal having one carrier frequency is used for signal modulation. The single-carrier methods or else SCM (Single Carrier Modulation) methods comprise, for example, the QAM or CAP methods. An example of a multi-carrier method is the DMT (Discrete Multi-Tone) method used in ADSL modems.

Both voice signals and data signals are transmitted via the subscriber lines. The voice and data signals are transmitted in different frequency bands. The data are transmitted via a so-called downstream and upstream channel which in each case use different transmission frequency bands. The frequency band used in VDSL (very high bit rate digital subscriber line) systems is between 138 kHz and 30 MHz. In the frequency band allocation for the data transmission, in each case one transmission frequency band is used for the downstream channel and the upstream channel in the simplest case, that is to say a total of two transmission frequency bands. It is also possible to use more than one transmission frequency band for both directions of transmission. Single-carrier methods use only one signal carrier per transmission frequency band whereas multi-carrier methods use a number of carriers per transmission frequency band.

The subscriber lines of the various subscriber modems are bundled at the switching office to form a cable bundle consisting of a number of data transmission lines. As a rule, the subscriber lines used for the data transmission are conventional two-wire telephone lines which are unshielded. For this reason, an interfering signal cross talk may occur between the subscriber lines.

In the cross talk, a distinction is made between so-called far end cross talk and near end cross talk. In the case of the near end cross talk (NEXT), for example, an unwanted injection of the signal transmitted by a first switch modem into the access line of another switch modem occurs. In the case of far end cross talk (FEXT), the signal transmitted from a subscriber modem to the associated switch modem is injected into another subscriber line in the area of the cable bundle and thus interferes with the received signal of another switch modem.

Figure 1A:
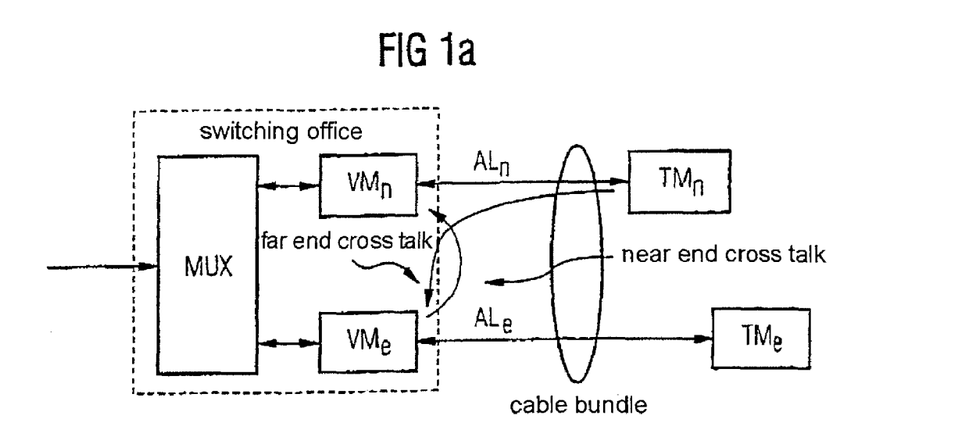
FIG. 1a, b shows a subscriber access network of the prior art for explaining the problems according to the invention.
Figure 1B:
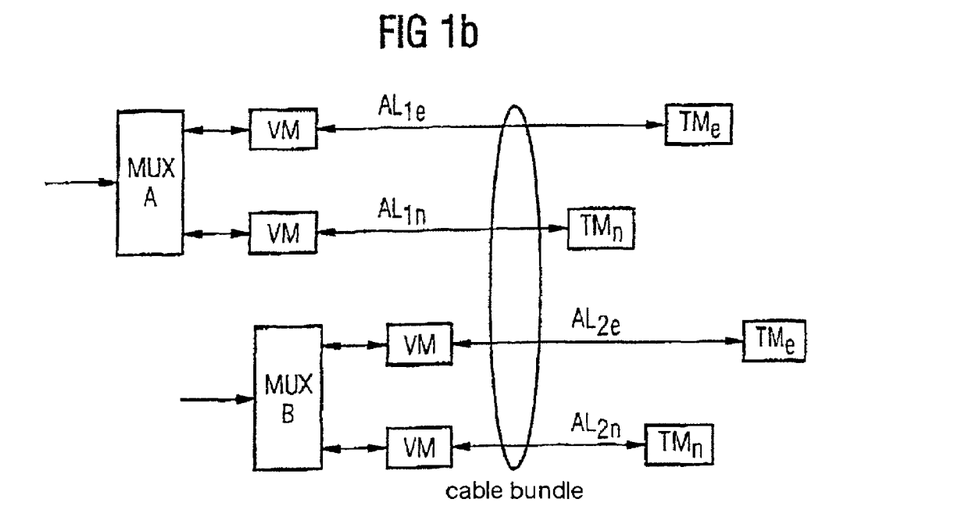

FIG. 1a shows a conventional subscriber access network with a switching office containing a number of switch modems VM to which subscriber modems TM are in each case connected via access lines AL. In the example shown in FIG. 1, two subscriber modems TM are connected to the switching office. The first subscriber modem $TM_N$ is located in the local area of the switching office, for example only 300 m away from the switching office. The other subscriber modem $TM_E$ is remote from the switching office, for example at a distance of over 1000 m. The attenuation of the data transmission signal sent by a subscriber modem depends both on the transmit signal frequency and on the distance between the switch modem and the subscriber modem. If the remote subscriber modem $TM_E$ and the local subscriber modem $TM_N$ transmit the transmit signal at the same power via the upstream channel, a far end cross talk will occur in the area of the switching office from the subscriber line $AL_N$ of the local subscriber modem $TM_N$ onto the subscriber line AE of the remote subscriber modem $TM_E$. In this case, the transmission of the remote TM is disturbed more than in the case in which a number of modems transmit from the same distance. The same situation occurs if there are a number of switching offices at different distances from the subscriber modems (FIG. 1b). In the last-mentioned case, the downstream frequency band is also subsequently affected by the method according to the invention.

Figure 2A:
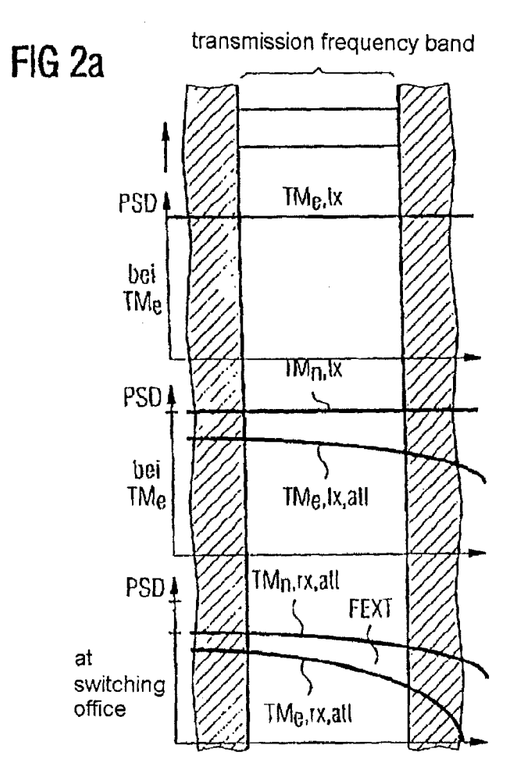
FIG. 2 shows transmit power spectra for the subscriber access network of the prior art, shown in FIG. 1.

FIG. 2 shows the variation of the spectral power density PSD in the subscriber access network shown in FIG. 1. The transmit signal of the remote subscriber modem $TM_E$ exhibits a constant transmit power spectrum at the location of the remote subscriber modem $TM_E$. In the area of the local subscriber modem $TM_N$, the transmission spectrum of the remote modem $TM_E$ is already attenuated and is below the transmit power spectrum of the local subscriber modem $TM_N$. At the switching office, both transmit signals are attenuated due to the line attenuation, although the spectral power level of the local subscriber modem $TM_N$, received by the switching office, is clearly higher than the spectral power level of the remote subscriber modem $TM_E$. For this reason, far end cross talk (FEXT) occurs.

Figure 2B:
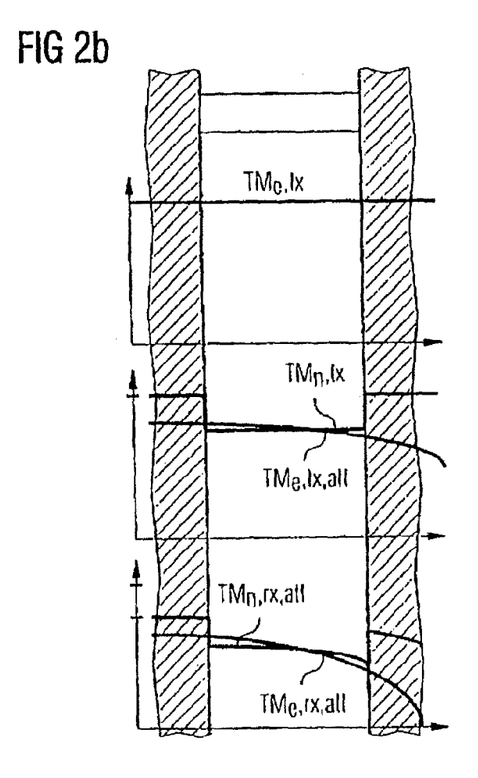

In conventional systems, therefore, a transmit power reduction as shown in FIG. 2b is performed at the local subscriber modem $TM_N$. This transmit power reduction is also called power back-off PBO. For this purpose, the transmit power of the local subscriber modem $TM_N$ is constantly lowered over the entire transmission frequency band. As a result, the power difference between the received signals on the various subscriber lines AL received signals is reduced in the area of the switching office and far end cross talk TEXT is thus reduced. As can be seen in FIG. 2b, the difference between the attenuated data signal received from the local subscriber modem $TM_N$ and the received signal received from the remote subscriber modem $TM_E$ is less than in the case without transmit power reduction shown in FIG. 2a in the area of the switching office.

It is mainly in the case of mixed operation of modems with different methods for transmit power reduction that there are differences between the various transmit signal powers leading to an inadmissible far end cross talk.

SUMMARY

It is therefore the object of the present invention to provide a method for transmitting transmit data using a subscriber modem of a subscriber access network with adapted transmit power, in which the far end cross talk is minimized.

In particular, the method is intended to be suitable for operating systems with different line coding methods and different methods for transmit power reduction in a subscriber access network.

According to the invention, this object is achieved by a method for transmitting transmit data, having the features specified in patent claim 1.

The invention provides a method for transmitting transmit data using a subscriber modem of a subscriber access network with adapted transmit power, the method exhibiting the following steps:

(a) selecting at least one transmission frequency band;

(b) subdividing the selected transmission frequency band into a number of subfrequency bands;

(c) determining the maximum transmit power associated with each subfrequency band and selecting a particular maximum transmit power from the maximum transmit powers determined;

(d) transmitting the transmit data with an adapted transmit power from the subscriber modem via an associated subscriber line to a switch modem of the subscriber access network, wherein, in a single-carrier operating mode, the transmit data are transmitted with the particular transmit power in all subfrequency bands, wherein, in a multi-carrier operating mode, the transmit data are in each case transmitted in the subfrequency bands with the associated maximum transmit power determined.

In a preferred embodiment of the method according to the invention, the lowest transmit power of the maximum transmit powers of the various subfrequency bands determined is selected as the particular transmit power.

In a preferred embodiment of the method according to the invention, the maximum transmit power of the subfrequency bands is determined in dependence on the length of the subscriber line between the subscriber modem and the switch modem.

In a preferred embodiment of the method according to the invention, the determining of the maximum transmit power associated with each subfrequency band comprises the following steps:

generation of configuration data of the subscriber access network which specify the length of the subscriber line between the subscriber modem and the switch modem of the subscriber access network by the switch modem in dependence on signal/noise ratios of transmitted data or, respectively, the corresponding receive power;

transmitting the generated configuration data from the switch modem to the subscriber modem;

determining the associated maximum transmit power for each subfrequency band by the subscriber modem in dependence on the transmitted configuration data, in such a manner that the far end cross talk between the subscriber lines is minimized.

In a preferred embodiment of the method according to the invention, the selected transmission frequency band is used for data transmission via associated subscriber lines by other subscriber modems of the subscriber access network.

In a preferred embodiment of the method according to the invention, the subscriber modem is an FDD modem.

In a preferred embodiment of the method according to the invention, the subscriber modem is a VDSL modem.

In a preferred embodiment of the method according to the invention, the transmission frequency band for transmitting the transmit data is an upstream channel frequency band of an xDSL data transmission system.

In a preferred embodiment of the method according to the invention, the transmission frequency band for transmitting the transmit data is a downstream channel frequency band of an XDSL transmission system.

In a preferred embodiment of the method according to the invention, the configuration data of the subscriber access network are transmitted in a control channel frequency band via a predetermined control channel.

In a preferred embodiment of the method according to the invention, the operating mode in which the subscriber modem transmits is adjusted.

BRIEF DESCRIPTION OF THE DRAWINGS

In the text which follows, preferred embodiments of the method according to the invention are described for explaining features essential to the invention, referring to the attached figures, in which.

DETAILED DESCRIPTION

Figure 3:
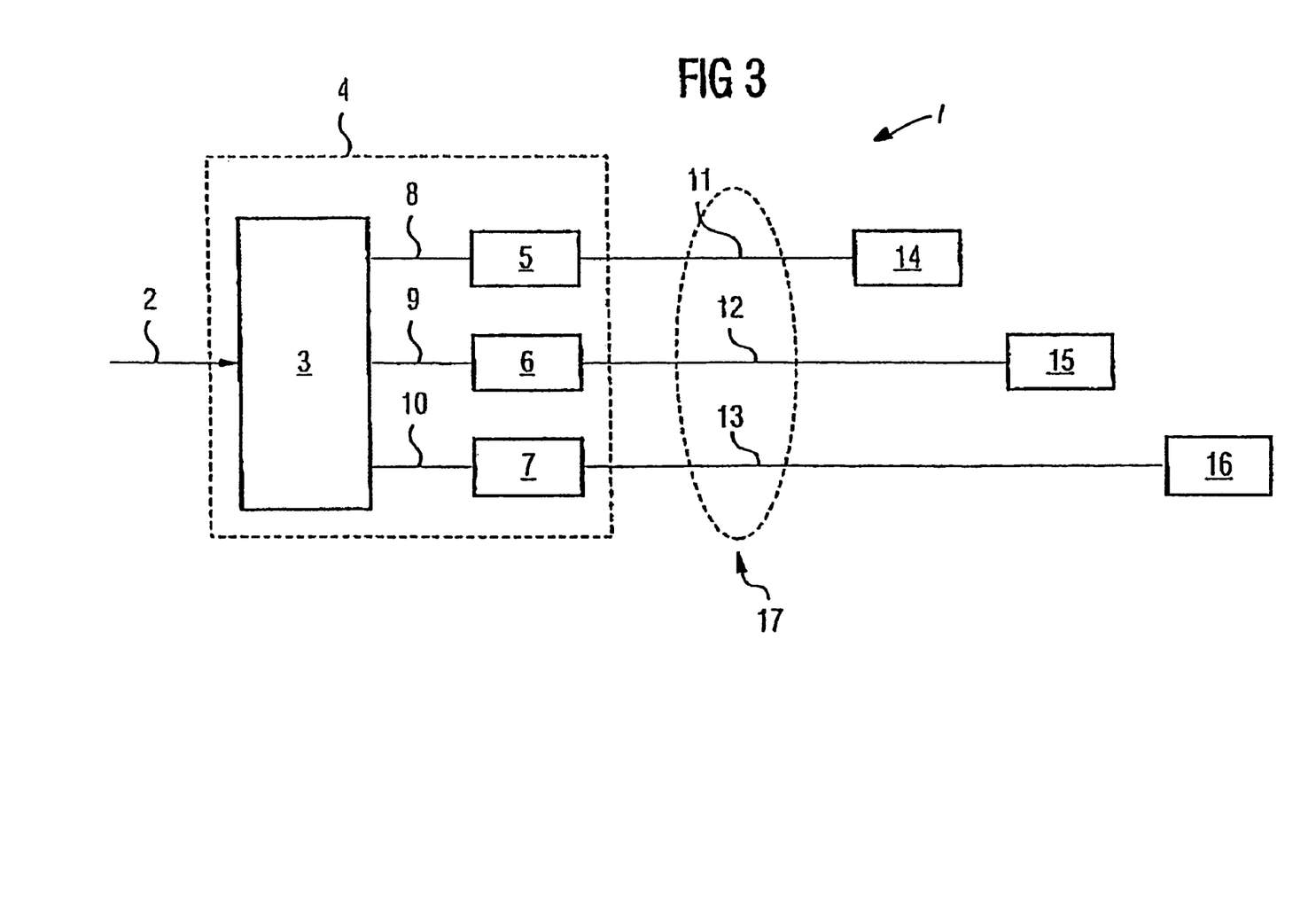
FIG. 3 shows a subscriber access network in which the method according to the invention is used.

FIG. 3 shows a subscriber access network 1 with a broadband transmission line 2 to which a switching device 3, particularly a multiplexer, of a switching office 4 is connected. The switching office 4 contains a number of switch modems 5, 6, 7 which are connected to outputs of the switching device 3 via lines 8, 9, 10. The switch modems are in each case connected to an associated subscriber modem 14, 15, 16 via subscriber lines 11, 12, 13. The various subscriber modems 14, 15, 16 can be connected to subscriber terminals, for example personal computers, for transmitting and receiving data. The subscriber modems 14, 15, 16 and the switch modems 5, 6, 7 are FDD modems. In the example shown in FIG. 3, the subscriber modem 14 is a very closely situated subscriber modem, the subscriber line 11 of which has, for example, a length of only 300 m. The subscriber modem 15 is connected via a subscriber line 12 to the switching office 4, the subscriber line 12, for example, having a mean line length of about 1000 m. The subscriber modem 16, for example, is connected to the switching office 4 via a particularly long subscriber line 13, the subscriber line 13 having a length of, for example, 1500 m.

The various access lines 11, 12, 13 are bundled in a cable bundle 17 in the area of the switching office 4, which bundle is shown dashed in FIG. 3. To minimize any far end cross talk FEXT between the subscriber lines 11-13 in the area of the switching office 4, the signal spectra received by the switch modems 5, 6, 7 are largely matched to one another by the method according to the invention so that the far end cross talk is minimized. In this arrangement, in particular, the different attenuation due to the different access line lengths is equalized.

Figure 4:
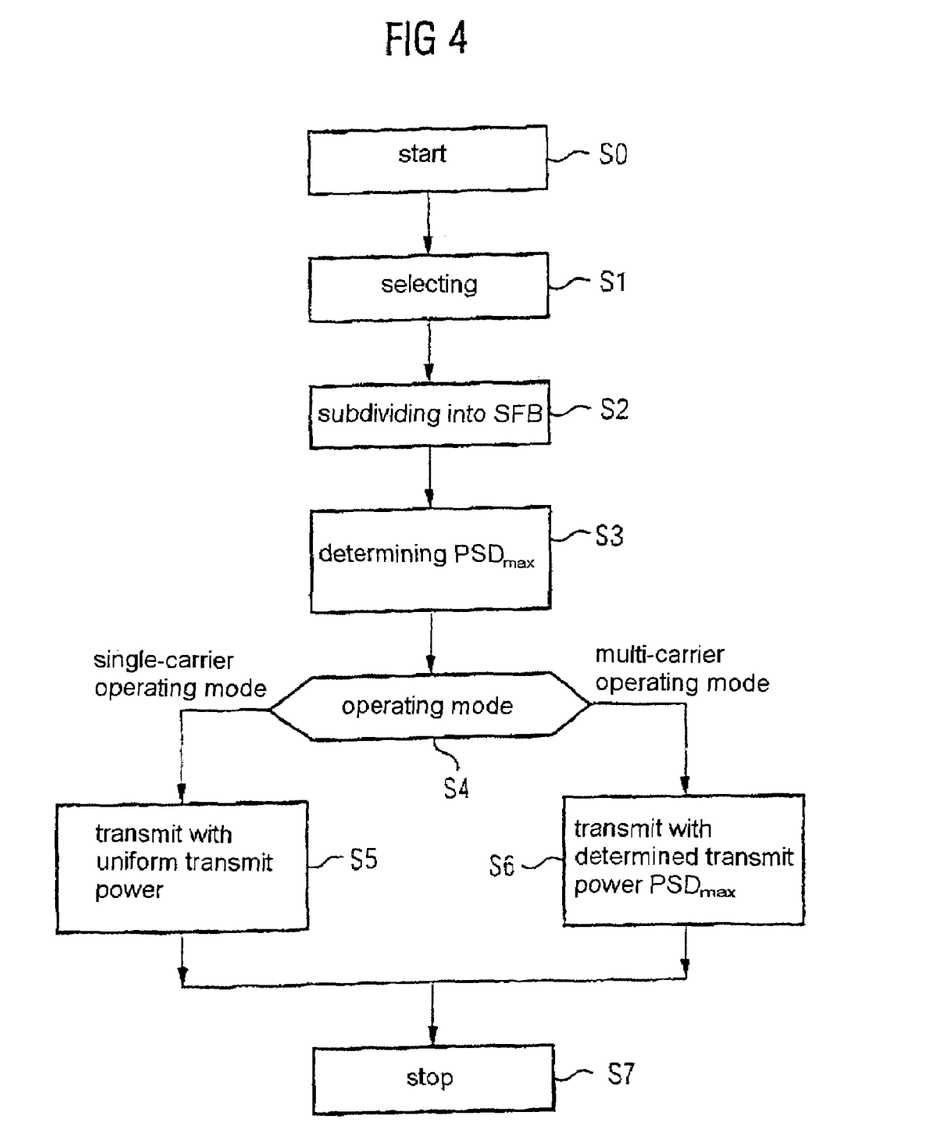
FIG. 4 shows a flow chart of the method according to the invention for transmitting transmit data using a subscriber modem of a subscriber access network with adapted transmit power according to the invention.

FIG. 4 shows a flow chart of the method according to the invention for transmitting transmit data using a subscriber modem 14, 15, 16 of the subscriber access network 1 with adapted transmit power for reducing the far end cross talk. After the start of the method in step S0, at least one transmission frequency band ÜFB is selected in a step S1. The selected transmission frequency band ÜFB is a transmission frequency band which is also used for data transmission by the other subscriber modems of the subscriber access network 1. For example, the two transmission frequency bands $ÜFB_a$, $ÜFB_b$ are selected from three possible transmission frequency bands $ÜFB_a$, $ÜFB_b$, $ÜFB_c$ for data transmission by the subscriber modem in step S1, as shown in FIG. 5.

In a step S2, the transmission frequency bands are subdivided into subfrequency bands which in each case have a constant frequency band width $\Delta f_i$.

The following holds true:

$$\Delta f_a = n \cdot \Delta f_i,$$

$$\Delta f_b = m \cdot \Delta f_i,$$

where $\Delta f_i$ is the frequency bandwidth of a subfrequency band SB and is preferably determined by the circuit configuration of the subscriber modem.

In a preferred embodiment of the method according to the invention, the frequency bandwidth $\Delta f_i$ of a subfrequency band SB can be adjusted.

The number n, m of subfrequency bands SB is either determined by the circuit configuration of the subscriber modem or is adjustable.

In a step S3, the maximum transmit power associated with each subfrequency band SB or, respectively, the maximum spectral power density $PSDmax_i$ is determined. The switch modem 5, 6, 7 in each case determines the length or electrical length of the associated subscriber line 11, 12, 13.

This is done by measuring the receive power at the receiver of the switch modem. For this purpose, the subscriber modem transmits with a predefined transmit power which is known to the subscriber modem and to the switch modem. The transmit signal is attenuated in dependence on frequency by the subscriber line 11, 12, 13. Using a measuring device, the receive power of the transmission frequency band or subband is determined. From the difference between transmit and receive power, the insertion loss which reflects the electrical length of the subscriber line 11, 12, 13 can be calculated. Knowledge of the electrical properties of the cable used, or simple length information, are the prerequisite for determining the physical length.

In a preferred embodiment of the method according to the invention, the signal/noise ratio is formed from the difference between expected received signal power and noisy received signal power actually received, the signal/noise ratio being formed over the entire transmission frequency band $ÜFB_i$, the signal/noise ratio being formed sequentially over all or some subfrequency bands $SB_i$, the signal/noise ratio being formed at the same time over all or some subfrequency bands $SB_i$.

The switching office 4 generates from the insertion losses determined or from the insertion losses determined in combination with the signal/noise ratios of the transmission frequency bands or subfrequency bands configuration data of the subscriber access network 1 and transmits the configuration data generated from the switch modem 5, 6, 7 via the associated subscriber line 11, 12, 13 to the respective subscriber modem 14, 15, 16. From the configuration data obtained, the respective subscriber modem 14, 15, 16 determines the maximum transmit power $PSDmax_i$ permissible in each case for each subfrequency band $SB_i$. In the process, the maximum transmit power $PSDmax_i$ of the respective subbands $SB_i$ is calculated in such a manner that the far end cross talk FEXT between the subscriber lines 11, 12, 13 is minima in the area of the cable bundle 17.

Figure 5A:
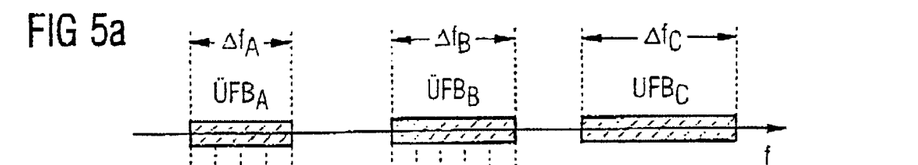
FIG. 5 shows transmit power spectra of the subscriber modems when the method according to the invention is used.
Figure 5B:
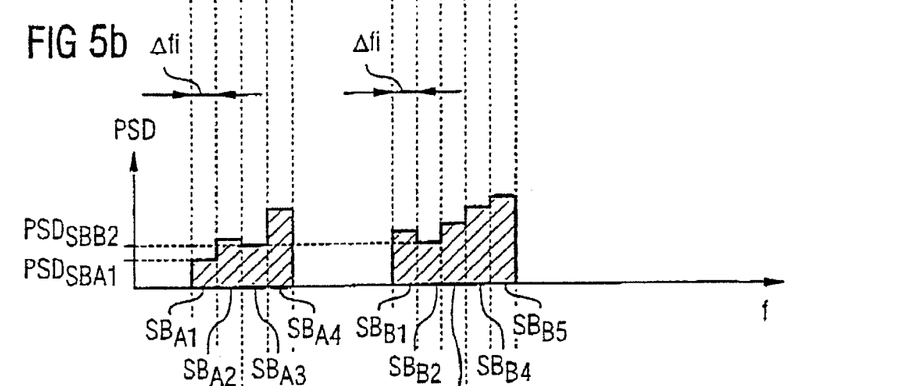
Figure 5C:
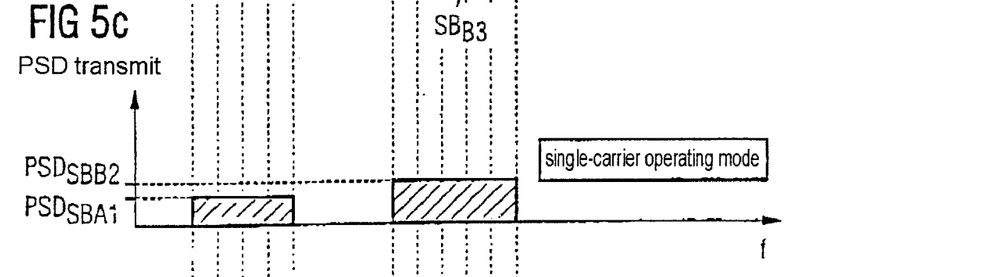

FIG. 5b shows an example of a signal power spectrum determined by a subscriber modem, in which the maximum permissible transmit powers $PSDmax_i$ for the respective subbands $SB_i$ in the two transmission frequency bands $ÜFB_a$, $ÜFB_b$ are specified.

In a step S4, a decision is made about what operating mode the subscriber modem is in. The operating mode of the subscriber modem can preferably be set externally, for example by means of a switching device provided at the respective subscriber modem.

In a preferred embodiment of the method according to the invention, separately configured modems are used for each operating mode.

The subscriber modem can transmit the transmit data to the associated switch modem either in a single-carrier operating mode or in a multi-carrier operating mode. In the single-carrier operating mode, the transmit data are modulated on one carrier whereas, in the multi-carrier operating mode, transmit data are modulated onto a number of carriers.

If the subscriber modem detects in step S4 that the single-carrier operating mode is set, the transmit data are transmitted with a particular uniform transmit power of the maximum transmit powers $PSDmax_i$ determined in all subfrequency bands SB in a step S5. This is shown diagrammatically in FIG. 5c. The uniform transmit power is preferably the lowest transmit power of the maximum transmit powers $PSDmax_i$ of the subfrequency bands $SB_i$ determined. This transmit power ensures in every case that there is minimum far end cross talk in the area of the cable bundle 17. In an alternative embodiment, the uniform transmit power transmitted in step S5 can also be above the lowest transmit power of the maximum transmit powers determined, some far end cross talk deliberately being accepted.

As can be seen in FIG. 5, the lowest transmit power of the maximum transmit powers $PSBmax_i$ determined is, in the example shown in FIG. 5, the maximum permissible transmit power $PSD_{SBA1}$ in subfrequency band $SBA_i$ in the transmission frequency band $ÜFB_A$. The lowest transmit power of the maximum transmit power of the subfrequency bands $SB_B$ determined within the transmission frequency band $ÜFB_B$ is, in the example shown in FIG. 5b, the maximum permissible transmit power $PSD_{SBB2}$ in the subfrequency band $SBB_2$.

With single-carrier operating mode set, the transmit data are transmitted with the maximum permissible transmit power of subfrequency band $SB_{A1}$ in the transmission frequency band $\text{ÜFB}_A$, and with the maximum permissible transmit power of subfrequency band $SB_{B1}$ in the transmission frequency band $\text{ÜFB}_B$. As a result, any far end cross talk FEXT is suppressed in every case in the area of the switching office 4. Minimization of the far end cross talk FEXT leads to lower noise powers and thus to higher signal/noise ratios and the data transmission channel capacity [lacuna] increased. As a result, the data transmission rate or the possible permissible distance between the subscriber modem and the switch modem is considerably increased.

Figure 5D:
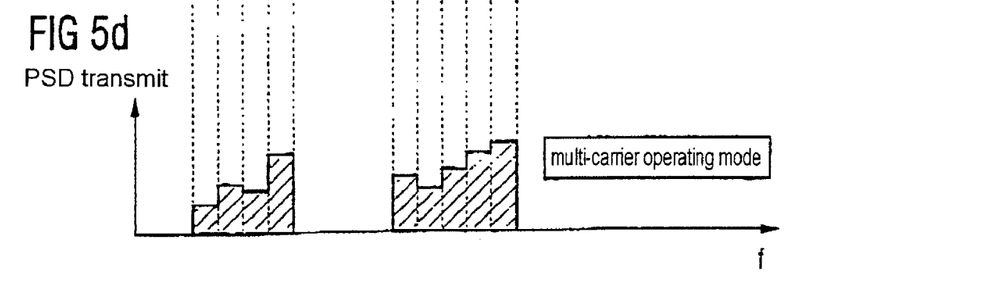

If the subscriber modem detects in step S4 that multi-carrier operating mode is set, the transmit data in the subfrequency bands SB are in each case transmitted with the associated maximum transmit power $PSDmax_i$ determined in step S6. This is shown in FIG. 5d. As can be seen from the comparison in FIGS. 5b and 5d, the transmit power PSD-transmit in the multi-carrier operating mode corresponds to the spectrum shown in FIG. 5b. In multi-carrier operating mode, a number of signal carriers are used for signal modulation for each selected transmission frequency band UFB. Each subfrequency band SB has its own signal modulation carrier. The multi-carrier modulation method is, for example, a DMT method with a multiplicity of signal carrier frequencies.

After the transmit data have been transmitted, the method is ended in step S7.

In the method according to the invention, a more accurate adaptation of the transmit signal powers of the subscriber modems 14, 15, 16 for reducing far end cross talk FEXT is achieved by the subdivision into subbands SB. In the method according to the invention, both single-carrier mode with a single-carrier modulation method and multi-carrier mode with a multi-carrier modulation method are also possible. The method according to the invention ensures spectral compatibility between transmission systems of different configuration in a common cable bundle. In particular, the method according to the invention is suitable for use with xDSL modems, particularly VDSL modems.

LIST OF DESIGNATIONS 1 subscriber access network
2 data transmission line
3 switching device
4 switching office
5, 6, 7 switch modems
8, 9, 10 lines
11, 12, 13 subscriber lines
14, 15, 16 subscriber modems
17 cable bundle

The invention claimed is:

1. A method for transmitting transmit data using a subscriber modem of a number of subscriber modems connected via subscriber lines bundled in a cable bundle to associated switch modems of a switching office within a subscriber access network with adapted transmit power, the method comprising the following steps:
    (a) selecting at least one transmission frequency band from possible transmission frequency bands used by the other subscriber modems of said number of subscriber modems;
    (b) subdividing the selected transmission frequency band into a number of subfrequency bands;
    (c) determining the maximum transmit power associated with each subfrequency band of the selected transmission frequency band;
    (d) transmitting the transmit data with an adapted transmit power from the subscriber modem via an associated subscriber line to the associated switch modem, wherein, in a single-carrier operating mode, the transmit data are transmitted with a uniform transmit power selected as the lowest transmit power from the maximum transmit powers determined in all subfrequency bands of the selected transmission frequency band, and wherein, in a multi-carrier operating mode, the transmit data are in each case transmitted in the subfrequency bands with the determined associated maximum transmit power.

2. The method as claimed in claim 1, in which the maximum transmit power of the subfrequency bands SB is determined in dependence on the length or electrical length of the subscriber line between the subscriber modem and the associated switch modem.

3. The method as claimed in claim 1, in which the determining of the maximum transmit power associated with each subfrequency band comprises the following steps:
    generating configuration data of the subscriber access network which specify the length of the subscriber lines between the subscriber modems and the associated switch modems of the subscriber access network by the associated switch modems in dependence on signal/noise ratios or, respectively, receive power;
    transmitting the generated configuration data from a switch modem to the associated subscriber modem;
    determining the associated maximum transmit power for each subfrequency band by the subscriber modem from the transmitted configuration data, in such a manner that the far end cross talk between the subscriber lines is minimized.

4. The method as claimed in claim 1, in which the subscriber modem (14, 15, 16) is in each case an FDD modem.

5. The method as claimed in claim 1, in which the subscriber modem is in each case a VDSL modem.

6. The method as claimed in claim 1, in which the transmission frequency band is an upstream channel frequency band of an xDSL data transmission system.

7. The method as claimed in claim 1, in which the transmission frequency band is a downstream channel frequency band of an XDSL data transmission system.

8. The method as claimed in claim 1, in which the operating mode in which the subscriber modem transmits is adjusted.

9. A subscriber modem of a number of subscriber modems connected via subscriber lines bundled in a cable bundle to associated switch modems of a switching office within a subscriber access network, wherein said subscriber modem comprises:
    (a) means for selecting at least one transmission frequency band from possible transmission frequency bands used by the other subscriber modems of said number of subscriber modems;
    (b) means for subdividing the selected transmission frequency band into a number of subfrequency bands;
    (c) means for determining the maximum transmit power associated with each subfrequency band of the selected transmission frequency band;
    (d) means for transmitting the transmit data with an adapted transmit power from the subscriber modem via an associated subscriber line to the associated switch modem, wherein, said means for transmitting is adapted to transmit in a single-carrier operating mode the transmit data with a uniform transmit power selected as the lowest transmit power from the maximum transmit powers determined in all subfrequency bands, and wherein, said means for transmitting is adapted to transmit in a multi-carrier operating mode the transmit data in the subfrequency bands respectively with the determined associated maximum transmit power, for matching the signal spectra received by said switch modems to minimize the far end cross talk (FEXT) between said subscriber lines in the area of said switching office.

10. The subscriber modem as claimed in claim 9, in which the maximum transmit power of the subfrequency bands is determined in dependence on the length or electrical length of the subscriber line between the subscriber modem and the associated switch modem.

11. The subscriber modem as claimed in claim 9, wherein said means for determining the maximum transmit power associated with each subfrequency band comprises:
(a) means for generating configuration data of the subscriber access network which specify the length of the subscriber lines between the subscriber modems and the associated switch modems of the subscriber access network by the associated switch modems in dependence on signal/noise ratios or, respectively, receive power;
(b) means for transmitting the generated configuration data from a switch modem to the associated subscriber modem;
(c) means for determining the associated maximum transmit power for each subfrequency band by the subscriber modem from the transmitted configuration data, in such a manner that the far end cross talk (FEXT) between the subscriber lines is minimized.

12. The subscriber modem as claimed in claim 9, in which the subscriber modem is a FDD modem.

13. The subscriber modem as claimed in claim 9, in which the subscriber modem is a VDSL modem.

14. The subscriber modem as claimed in claim 9, in which the transmission frequency band is an upstream channel frequency band of an XDSL data transmission system.

15. The subscriber modem as claimed in claim 9, in which the transmission frequency band is a downstream channel frequency band of an XDSL data transmission system.

16. The subscriber modem as claimed in claim 9, in which the operating mode in which the subscriber modem transmits is adjusted.

* * * * *